United States Patent [19]
Wood

[11] 3,863,199
[45] Jan. 28, 1975

[54] BEAM FORMING OF MULTIPLE SIGNALS

[75] Inventor: David E. Wood, Schenectady, N.Y.

[73] Assignee: General Electric Company, Schenectady, N.Y.

[22] Filed: Dec. 15, 1961

[21] Appl. No.: 160,698

[52] U.S. Cl. ............................... 340/3 R, 340/6 R
[51] Int. Cl. ........................... G01s 7/54, G01s 9/66
[58] Field of Search ............. 340/1, 3, 5, 6, 15.5, 16, 340/173, 172.5; 343/5, 17.1, 100.7, 16, 113; 235/181

[56] References Cited
UNITED STATES PATENTS

| | | | |
|---|---|---|---|
| 2,712,415 | 7/1955 | Piety | 235/181 |
| 2,839,149 | 6/1958 | Piety | 181/0.5 |
| 3,030,021 | 4/1962 | Ferre | 235/181 |

*Primary Examiner*—Richard A. Farley
*Attorney, Agent, or Firm*—Jerome C. Squillaro; Joseph T. Cohen

EXEMPLARY CLAIM

1. Apparatus for beam forming signals received from an array of signal pick-up devices including in combination recording means for receiving and recording on a recording medium the signal inputs from an array of signal input devices, said recording medium being adapted to have its light modifying characteristics changed by said recording means in accordance with the signal inputs to said recording means whereby a plurality of tracks of light modifying marks are recorded on the recording medium with each track of marks representing the signal supplied from one signal input device of the array, a light source positioned adjacent the recording medium for imaging a light beam through the tracks on the medium, beam forming mask means positioned over said recording medium for disposing over the recorded tracks in a selected sequence masks representing optimum signal output from each elemental point of a selected range of view of the array of signal pick-up devices, and electro-optical conversion means for converting the light passing through both the record track and the mask into an electric output signal representative of coincidence between the mask and the track record at points where such coincidence occurs.

8 Claims, 17 Drawing Figures

Patented Jan. 28, 1975
3,863,199
5 Sheets-Sheet 1
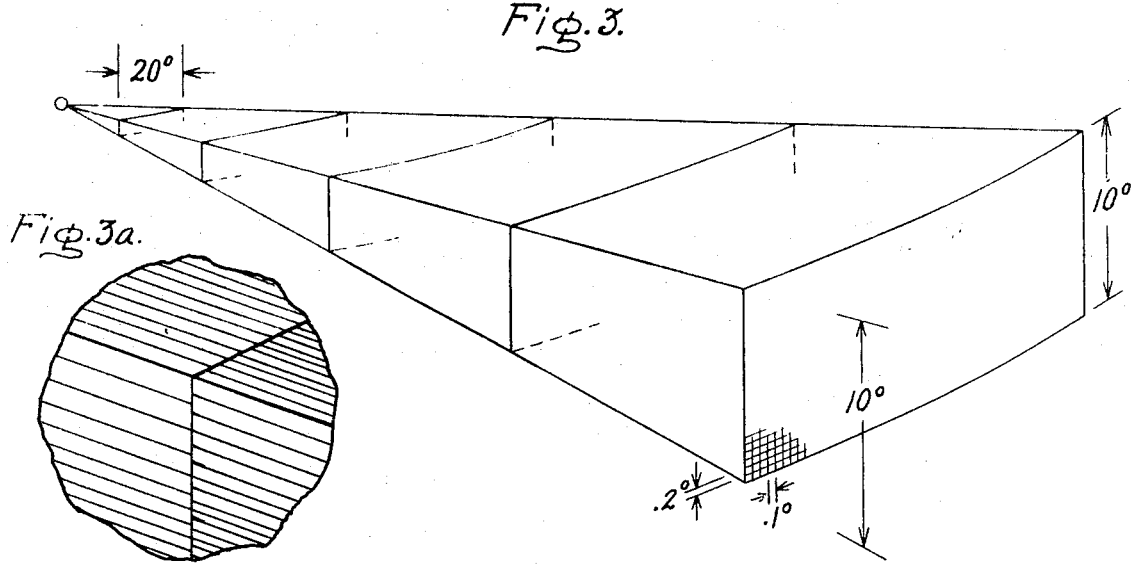
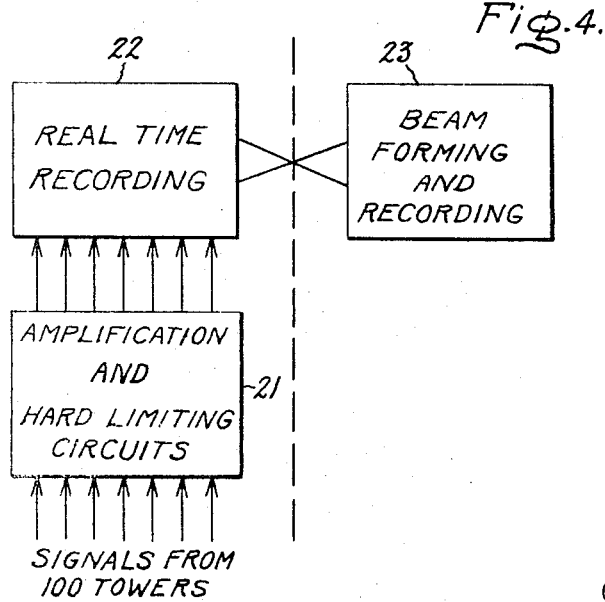
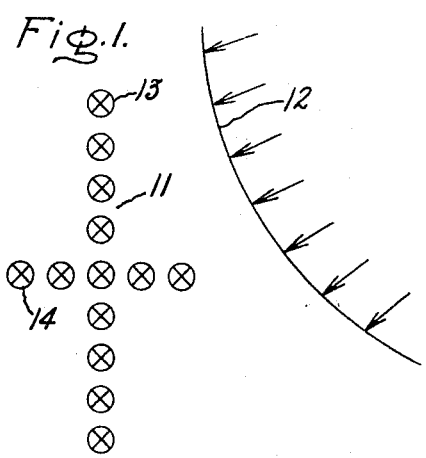
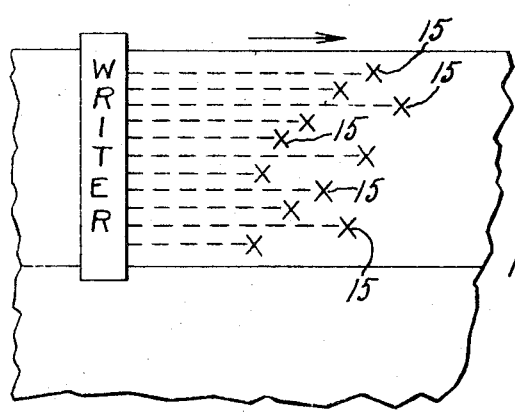
Inventor
David E. Wood
by Charles W. Helzer
His Attorney Patented Jan. 28, 1975
3,863,199
5 Sheets-Sheet 2
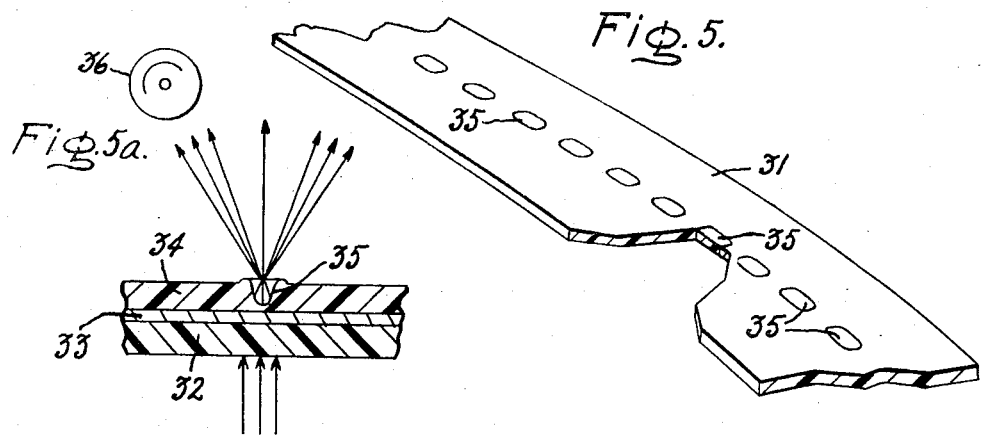
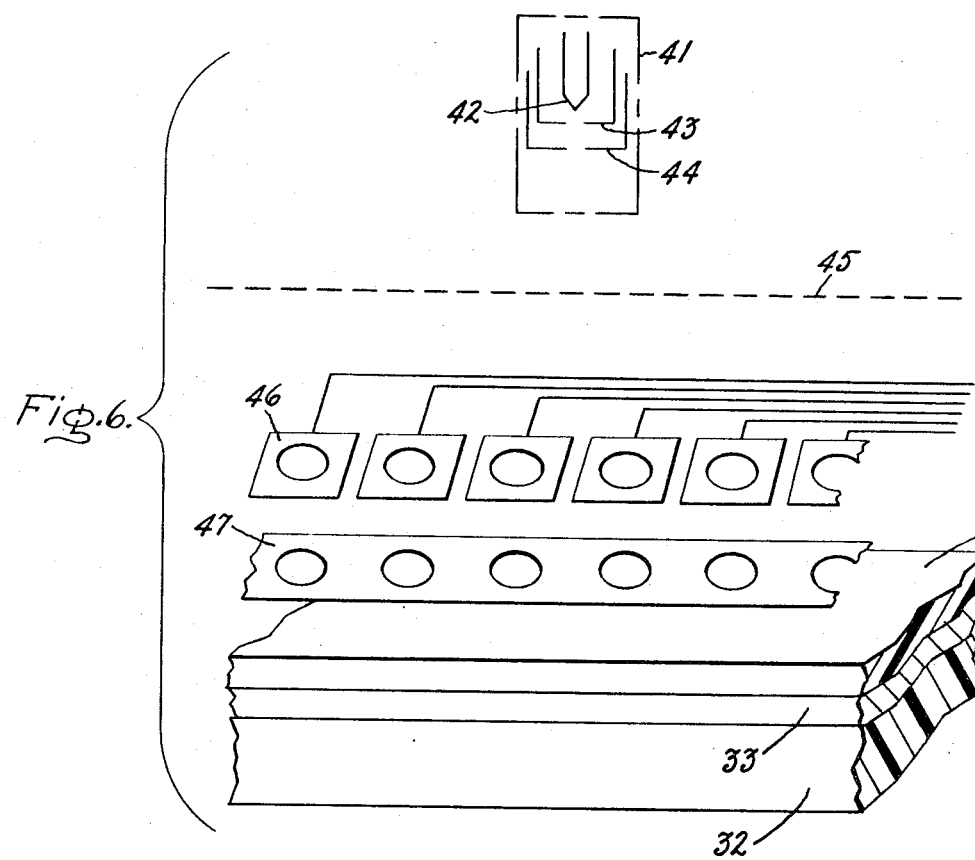
Inventor
David E. Wood
by Charles W. Helzer
His Attorney Inventor
David E. Wood
by Charles W. Helzer
His Attorney Patented Jan. 28, 1975

Inventor:
David E. Wood,
by Charles W Helzer
His Attorney.

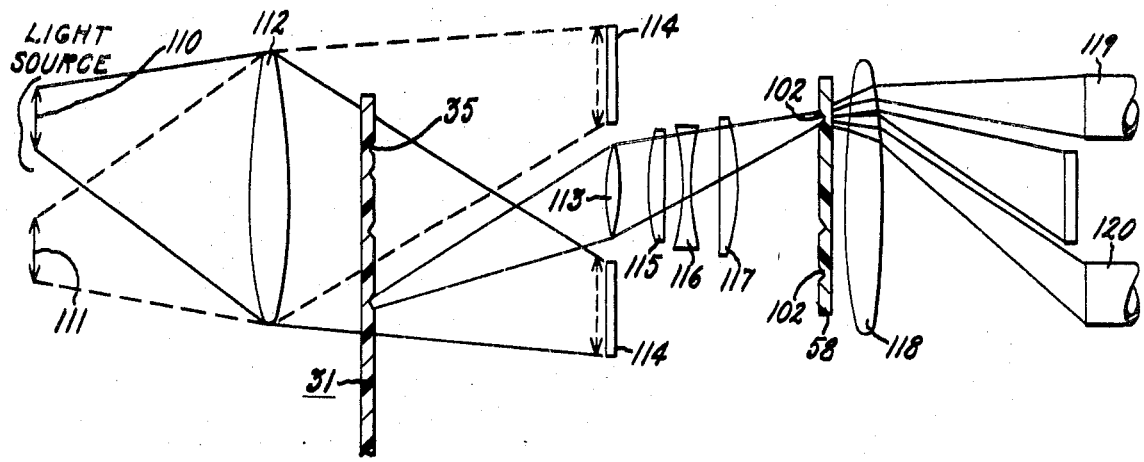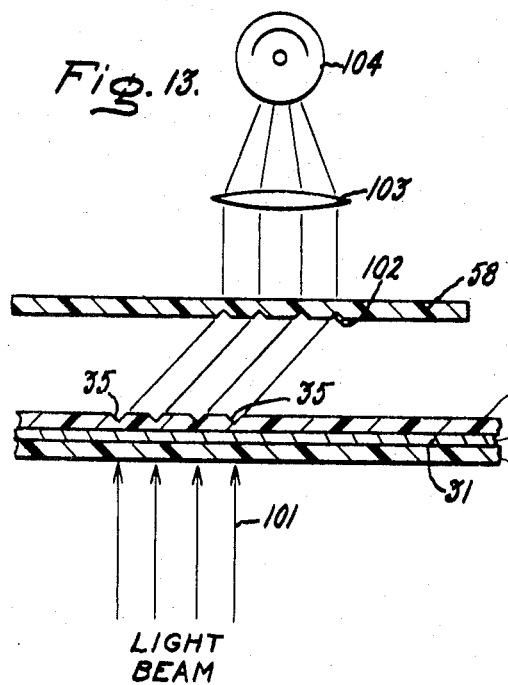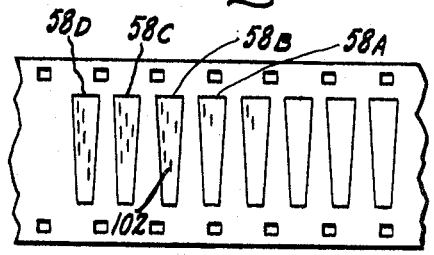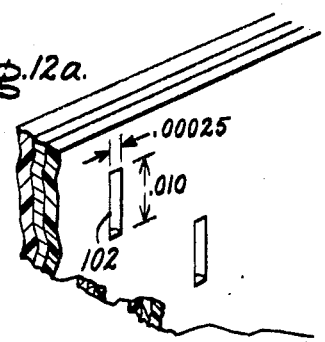

BEAM FORMING OF MULTIPLE SIGNALS

The present invention relates to a new and improved method and apparatus for beam forming the incoming signals received by a plurality of signal pick-up devices.

More specifically, the invention relates to a new and improved method and apparatus for processing a plurality of signals received from individual members of an array of signal pick-up devices and deriving a plurality of output signals representative of the signal returns from selected elemental angular segments of the field of view of the array of signal pick-up devices.

Recent developments in electronics warfare have brought into existence long range radar and sonar systems which employ large receiving arrays that may comprise, for example, some 100 signal receiving towers, each having a number of receiving elements such as hydrophones secured to it. The problem of processing the signals received by such receiving towers to make the array "look" at a particular angular segment of its field of view is referred to beam forming forming. By beam forming the signals received from the array of signal towers, it is possible to give the array directional characteristics which enable it to locate possible targets within its field of view. The present invention provides a newly improved method for beam forming signals from an array of receiving elements.

In practicing the invention, apparatus for beam forming signals is provided which is adapted to receive the signals from an array of signal pick-up devices and to record on a recording medium the individual signal inputs from each element of the array of signal input devices. The recording medium is of the type having a thermoplastic film recording surface adapted to have its light modifying characteristics changed by the recording in accordance with the signal inputs whereby a plurality of tracks of light modifying marks are recorded on the recording medium. Each track of light modifying marks represent the signal supplied from one signal input device of the array. A light source is positioned adjacent to the recording medium for imaging a light beam through the tracks on the medium. Beam forming mask means are positioned over the recording medium for disposing over the recorded tracks in a selected sequence, masks representing optical signal output from each elemental angular segment of a selected field of view of the array of signal pick-up devices. The system is completed by an electro-optical conversion means for converting light images passing through both the record track and the mask into an electric output signal representative of coincidence between the mask and the track records at points where such coincidence occurs.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein:

FIG. 1 is a diagrammatic layout of a sonar signal receiving array formed by a plurality of sonar receiving towers, and illustrates the relation of the array with respect to an incoming sound wave;

FIG. 2 is a plan view of a recording produced by the first recording operation of the beam forming system comprising the invention;

FIG. 3 is a schematic diagram illustrating the field of view or search sector of the array of signal input devices shown in FIG. 1;

FIG. 3a is a greatly magnified perspective view of a portion of the search sector illustrated by FIG. 3;

FIG. 4 is a functional block diagram of the beam forming system comprising the invention;

FIG. 5 is a perspective view of a partially broken away strip of thermoplastic film recording medium having a track of light modifying marks formed thereon by electron writing;

FIG. 5a is an exploded sectional view of the thermoplastic film recording medium shown in FIG. 5 and illustrates the light refracting properties of the light modifying marks formed by the recording medium;

FIG. 6 is a schematic arrangement of a multiple track electron gun used for writing multiple tracks of data on the thermoplastic film recording medium;

FIG. 12 is an enlarged plan view of the beam forming masks shown partially in FIG. 10 of the drawings;

FIG. 12a is a greatly magnified view of a portion of the thermoplastic film masks of FIG. 12 illustrating the relative size of the light modifying marks formed on the masks by electron writing;

FIG. 13 is a schematic diagram of the beam forming light optics system; and

FIG. 14 is a detailed side view of the beam forming light optics system shown schematically in FIG. 13.

THEORY OF OPERATION

Figure 7:
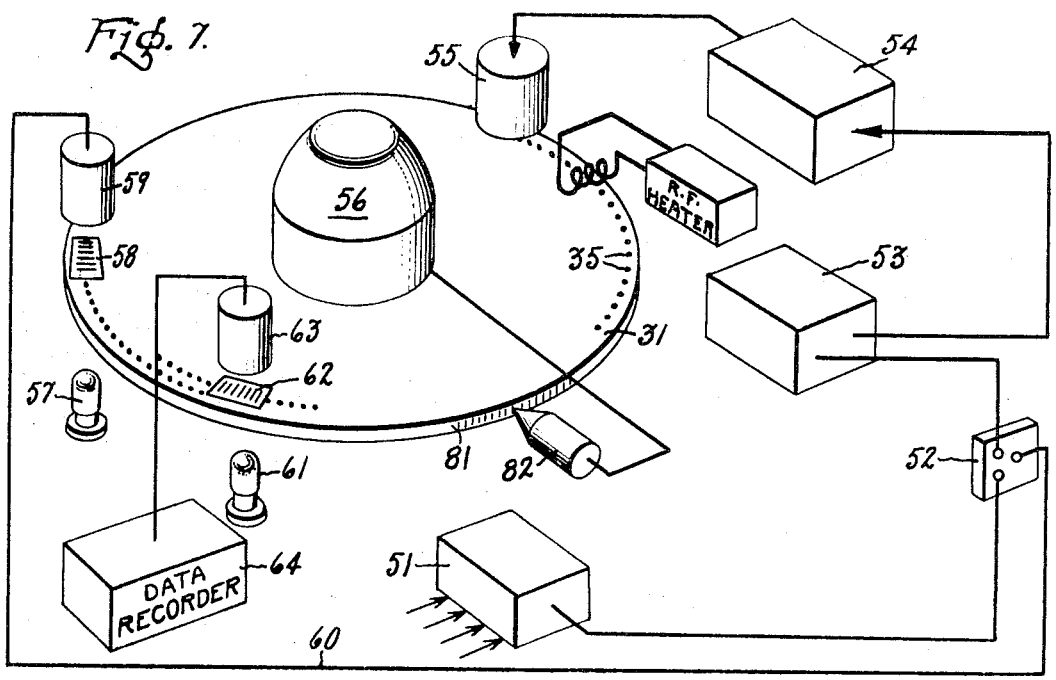
FIG. 7 is a functional block diagram of a beam forming system constructed in accordance with the invention.

The present data processing system was devised for use primarily in processing data received from a long range sonar system which is designed to keep large sectors of the ocean under surveillance. This long range sonar system is designed to detect and locate targets on or beneath the surface of the ocean within a sector extending hundreds of miles in range and of comparable breadth. Sonar detection over such long ranges requires that the returning target signal be maximized and both signal amplitude and frequency resolution be optimized. This requires that the angular and range resolution elements be quite small since small angular resolution both limits the volume seen in reception, and helps prevent destructive interference between target echoes received over different paths. With respect to range resolution, this resolution should be comparable to the echo source dimensions.

High angular resolution is achieved in a long range sonar system by the use of a very large array of receiver towers, each consisting of a group of hydrophones secured to a tower. Such an array of sonar receiving towers is illustrated schematically in FIG. 1 of the drawings. This array may extend for perhaps two miles in each direction, and is composed of hundreds of receiving towers. An array of this nature can produce an angular resolution element as small as one-tenth of a degree in azimuth, and about two-tenths of a degree in elevation. Such an array of receiving towers can be made to look in a desired direction by combining the tower output signals in a way which compensates for the differences in time of arrival at different array towers. This requires that for each angular resolution increment looked at, there is a corresponding set of "beam forming" delays which must be employed in combining the receiving tower output. This fact can be better appreciated from an examination of FIG. 1, wherein the array of receiving towers is shown at 11, and an incoming returning target signal wavefront is illustrated at 12. It can be appreciated that the incoming target signal wavefront will be received by the receiving tower 13 of the array, for example, at a point in time far in advance from the receiving tower 14 receiving the same target signal wavefront. If the receipt of the signal at each of the receiving towers in the receiving tower array were plotted in accordance with its time of receipt on a constantly moving recording medium, then the recorded plot would appear as shown in FIG. 2 of the drawings, wherein each of the Xs, such as shown at 15, represents the signal output from a respective receiving tower in the array. This recorded signal is processed as described above so that the receiving array is made to look at a small volume containing a target for the longest possible time. The beam forming delays are complicated by the fact that the delays required to make the receiving array "look" at a particular angular resolution element are a function of range. This stems from the fact that the curvature of the returning sound wavefronts will affect the delays in signal arrival at the receiving array to a degree which depends upon the shortness of the range. Hence, to search a specific angular increment at a given range, the received signal processing must typically provide a different family of beam forming signal delays for each of several range zones.

The purpose of a long range sonar system such as that with which the present data processing system is intended to be used, would be the detection and tracking of surface and subsurface craft travelling in large belts of ocean off of the coast of the United States. It is anticipated that one such system would consist of a single high powered sonar transmitter and a single receiving array of sonar hydrophone receiver elements mounted on towers. In order to cover the entire ocean off of the coast of the United States, it would, of course, be necessary to arrange such systems side-by-side so that the belts of ocean covered by each single system would tend to scan the whole ocean area. The present embodiment of data process system described, however, is intended to be used only with a single, long range sonar system consisting of the single, high powered sonar transmitter and the single receiving array of sonar receiving elements. This single sonar search system is proposed to search a sector of ocean 20° wide in azimuth and extending as far as 500 miles out from the receiving array. It is, of course, to be understood that this receiving sector can be readily modified by appropriate adjustment to the receiving array, and that the data processing system would, accordingly, be corrected as determined by the specific requirements of a certain application of the system. A typical search pattern is illustrated schematically in FIG. 3 of the drawings, wherein it is shown that the data processing system provided by the present invention is capable of dividing the 20° wide in azimuth field of search into one-tenth degree angular beam elements and two-tenths degree elevational beam elements, and that each angular beam thus comprised is, in turn, divided into a number of range zones. For the present purposes, four such range zones are described, and it is anticipated that the outermost of these range zones, for example the outer 125 miles in the proposed system, would consist of some 1,000 angular beam elements to cover the entire outer sector. It is proposed that the inner range sections would have fewer numbers of angular beam elements in order that each angular beam element scans an equivalent area in terms of linear measurement units of the sector being monitored. Such an arrangement is illustrated schematically in FIG. 3a of the drawings which comprises a blown-up view of an encircled portion of the sector being scanned by the receiving system of the array.

High range resolution of the system has to be achieved in order to limit reverberation to a range interval comparable to some average echo source size. This range increment ordinarily will be much shorter than the long transmitted sonar pulses envisioned in the long range sonar system and, therefore, it is anticipated that the long transmitted sonar pulses will be coded into sections. A returning echo will exhibit the same coding modulation, and detection of an echo can be accomplished by translating a record of the returned signal past a record of the code. When the polarities of the echo signal and the coded reference signal are found to be correspond, an output signal will be generated. The codes are chosen so that the correspondence of polarities is high only over the length of the range resolution element to be surveyed.

OVER-ALL RECORDING AND BEAM FORMING SYSTEM

FIG. 2 of the drawings shows a functional block diagram of the over-all beam forming system constructed in accordance with the invention. In this system, the signal inputs from, say, 100 sonar receiving towers, are supplied separately to appropriate circuitry for amplification and hard limiting of each of the signals. The hard limiting process is designed to emphasize the polarity information in the incoming signals and to eliminate amplitude effects. This process is carried on the circuits indicated by the block 21 and the electrical outputs from all 100 channels are electrically supplied to a real time recording device indicated at 22. The real time recording device 22 will record the signal output from each of the 100 signal towers on 100 tracks formed in a thermoplastic film recording medium in a manner to be described more fully hereinafter. By real time recording is meant that the signal inputs are recorded on the thermoplastic film recording medium in a precise one-to-one relation with respect to time that they are received from the receiving signal arrays. Hence, if the time required for a single long transmitted sonar pulse to go to the end of the range being searched and return is 22 minutes, then the real time recording of the pulse takes 22 minutes. Following the real time recording of the incoming target signals, the thermoplastic film recording medium is speeded up for the subsequent signal processing operations described hereinafter. The 100 tracks formed by the real time recorder 22 are optically read out and supplied in the form of a light image to the beam forming and recording circuitry indicated at 23. This circuitry accomplishes the beam forming operation mentioned above, and results in developing in any one single process some 200 signals representing the 200 azimuth angle elements looked at in a single processing operation. These signals may then be recorded on a conventional data recorder for subsequent analysis. It should be noted that the beam forming process accomplishes the beam forming operation for only 200 azimuth elements in a single azimuth fan extending two-tenths of a degree in elevation and 20° in azimuth. It is anticipated that subsequent to processing the returning signals from one such azimuth fan, the angle of look of the receiving array will be shifted two-tenths of a degree in elevation for successive periods of operation until the entire sector of 20° in azimuth and 10° in elevation has been surveyed.

With respect to the construction of the amplification and hard limiting circuits 21, these circuits are of conventional construction, and it is not deemed necessary to describe them in detail at this point in the specification, but they will be described more fully at the end of the disclosure.

The real time recorder 22 will employ a thermoplastic film returning medium, and the signals from each receiving tower will be recorded on a separate track on this recording medium. Thermoplastic film recording was first described in U.S. Pat. application Ser. No. 8842, filed Feb. 15, 1960, entitled "Method, Apparatus and Medium for Recording" W. E. Glenn, inventor, assigned to the General Electric Company, and for a more detailed description of this recording technique reference is made to the Glenn application. In addition to the above copending application, for a further description of suitable thermoplastic film recording mediums and methods of recording employing such mediums see U.S. Pat. Nos. 3,063,872, entitled "Recording Medium and Polysiloxane and Resin Mixture Therefor," Edith M. Boldebuck inventor, issued Nov. 13, 1962; 2,985,866, entitled "Information Storage System," J. F. Norton inventor, issued May 23, 1961; and 3,008,066, entitlted "Information Storage System," Sterling P. Newberry inventor, issued Nov. 7, 1961; all assigned to the General Electric Company. A fragmentary section of a thermoplastic recording disk is indicated at 31 in FIG. 5 of the drawings. The physical construction of this disk 31 is shown more fully in FIG. 6 of the drawings, wherein it can be seen that the thermoplastic disk itself comprises a supporting backing 32, such as Mylar or glass, which is transparent to light. Disposed over the transparent backing 32 is a transparent conductive coating 33 which serves as a heating plane for a radio frequency heater as will be explained more fully hereinafter, and formed over the transparent conductive coating 33 is a thermoplastic film layer 34. Suitable thermoplastic layers have been described in the above-identified copending Glenn application and, hence, will not be identified further. It should be noted, however, that the characteristics of this material are such that they will retain an electron charge when electrons are written thereon in intelligence conveying patterns. These patterns when subjected to heat from an infrared or radio frequency heating device acting on the transparent conductive coating, will form a depression or light modifying mark 35 in the surface of the thermoplastic film recording medium to indicate that electrons have been written at that point in accordance with the signal being recorded. The layer itself will not form the depression unless it is subjected to heat in the presence of the electron patterns written thereon. Upon subjecting the thermoplastic layer to heat, the layer becomes sufficiently fluid for the electrostatic forces due to the electrons to form the depression in the layer of the thermoplastic film. Hence, upon allowing the film to again solidify from its fluid or semi-liquid state, the depression will become permanent. It should be noted at this point that further heating of the thermoplastic film in the absence of electrons will erase the depression so that the light modifying marks 35, shown in FIG. 5, may be subsequently erased simply by heating the thermoplastic film. The precise nature of the light modifying marks 35 is illustrated more fully in the greatly magnified view of a mark 35 shown in FIG. 5a of the drawings. This figure grossly exaggerates the size of the light modifying marks 35, but does serve to illustrate that the light modifying mark 35 constitutes a depression in the surface of the thermoplastic film layer 34 which, upon having light directed therethrough, will serve to refract the light in the manner indicated by the arrows emanating from each side of the groove 35. It is this light refracting characteristic which allows the groove to record the presence of a signal at a particular point of the surface of the thermoplastic recording medium, and then, of course, the absence of the groove will record the absence of a signal. Accordingly, if the incoming signals from each of the receiving towers in the array is allowed to turn on an electron beam at a particular point along the length of the recording medium 31 when there is a positive polarity signal present, the light modifying marks 35 will be formed in the thermoplastic film recording medium upon subsequent heating to indicate the presence of the positive polarity signal pulse at this point of time in the returning signal. At this point in the description, it might be well to note that in order to read out a signal previously recorded on the thermoplastic film recording medium, a phototube, indicated at 36 in FIG. 5a, is located to one side of a light source positioned under the thermoplastic film recording medium so that in the presence of a light modifying mark 35, light will be refracted from the light source onto the phototube 36. The phototube 36 will then develop an output electric signal pulse to thereby indicate the presence of a positive polarity signal at this point along the thermoplastic film recording medium.

A suitable electron gun design for writing multiple tracks of the light modifying marks 35 on a thermoplastic film disk is illustrated in FIG. 6. This multiple electron gun comprises an electron source 41 formed by a filament 42, a first accelerating grid 43, and an accelerating anode 44, positioned in axial alignment over the filament 42. The central openings in the accelerating grid 43 and accelerating anode 44 are sufficiently wide so that the electron source 41 emits a field of electrons that are directed through a collecting grid structure 45 toward a line of 100 control grids indicated at 46. Each of the control grids 46 is connected separately to an output from one of the sonar receiving towers through its associated amplifying and hard limiting circuitry so that each of the individual control grids 46 will modulate the electrons passing therethrough in accordance with the signal being received from its associated receiving tower. The collector grid 45 serves to collect secondary emission electrons and to provide a uniform field for all of the control grid apertures 46. Positioned under the individual control grids 46 is a focussing electrode 47 having a series of apertures, each one of which is individually aligned with the aperture in its associated control grid 46.

During the writing operation, the transparent conductive film 33 of the thermoplastic film recording medium 31 will be grounded. In operation the electron source 41 will supply somewhere in the neighborhood of 50 microamperes of beam current in order that a maximum of about one-tenth of a microampere will be available in each of the control grid apertures 46. No deflection of the electron beams is required and this greatly simplifies the electron gun design. By this arrangement, in the absence of a singal on the control grid element 46, no electrons will be directed therethrough, and through the focussing aperture onto the thermoplastic film recording medium. However, in the presence of a signal on the control grid 46, electrons will be accelerated through the grid aperture and through the focussing aperture 47 onto the thermoplastic film recording medium. Hence, upon subsequent heating, a light refracting depression or mark 35 will be formed in a thermoplastic film recording medium at this particular point. It is, of course, to be understood that the line of control grids 46 will run transverse to the recording medium as it moves under the electron rider so that all of the tracks of light modifying marks for all of the receiving elements of the receiving array will be written simultaneously. Hence, the output side of the writing and subsequent heating stage of the recording will be some 100 tracks of light modifying marks 35 produced on the surface of the thermoplastic film recording medium 31 in the manner illustrated in FIG. 2 of the drawings.

The functional block diagram of the over-all system employing the real time recorder and showing its relation to a thermoplastic film recording disk, a beam forming and recording stage is illustrated in FIG. 7. In the system shown in FIG. 7, the several signal inputs from the respective receiving towers in the receiving array are supplied to respective amplifying channels in an amplifier shown at 51. The output from the amplifier is then supplied to the hard limiting circuit 53 which clips the signals and supplies them to a write amplifier 54. The output from the write amplifier is connected to an electron writing gun 55, which is similar in construction to the electron gun shown in FIG. 6 of the drawings. The electron gun 55 is disposed over a rotatable disk 31 having a thermoplastic film recording film formed on its upper surface, and adapted to be rotated by a drive motor 56. In the particular arrangement disclosed, it is intended that the motor 56 be capable of driving the disk 31 at a first predetermined speed related to the timing required for the transmitted radar coded pulse to reach the end of the range being surveyed and return to the receiving array while recording is in process. During this recording phase of operation, a plurality of reference marks 81 on the periphery are used to generate a reference signal that is used to maintain the speed of motor 56 constant. It should also be noted that the circumference of the disk 31 at the point where the tracks 35 are being recorded is related to the speed of rotation, and to the time required to completely record the returning echo signals. During recording, the thermoplastic film surface is simultaneously heated by a radio frequency heating device supplied from a source of radio frequency signals. The radio frequency energy acts upon the transparent conductive film to generate the required amount of heat to set the electron patterns. Upon completion of the recording operation, the motor 56 is then speeded up for the subsequent beam forming process. The beam forming process is carried out by a first light source 57 positioned under the rotatable disk 31 at the point where light produced by the source will be imaged through the light modifying marks 35, and through a beam forming mask illustrated schematically at 58 upon a suitable electro-optical converting device 59 such as the photocell detector. The signal output from the beam forming photocell detector 59 may then be supplied back through a conductor 60 and through a suitable switching device 52 to the input of the hard limiting circuit 53. The hard limiting circuit 53 then serves to limit the beam formed signals developed by the beam forming photocell 59 and supply them to a data recorder or other display device. The remaining elements of the system illustrated in FIG. 7 comprise parts of a data processing system which is the subject matter of a copending U.S. Pat. application Ser. No. 160,699 - filed Dec. 15, 1961 (General Electric Patent Docket 14D-1725) D. E. Wood and W. T. Gannon, Inventors, entitlted "Signal Correlation System," and assigned to the General Electric Company.

Figure 8:
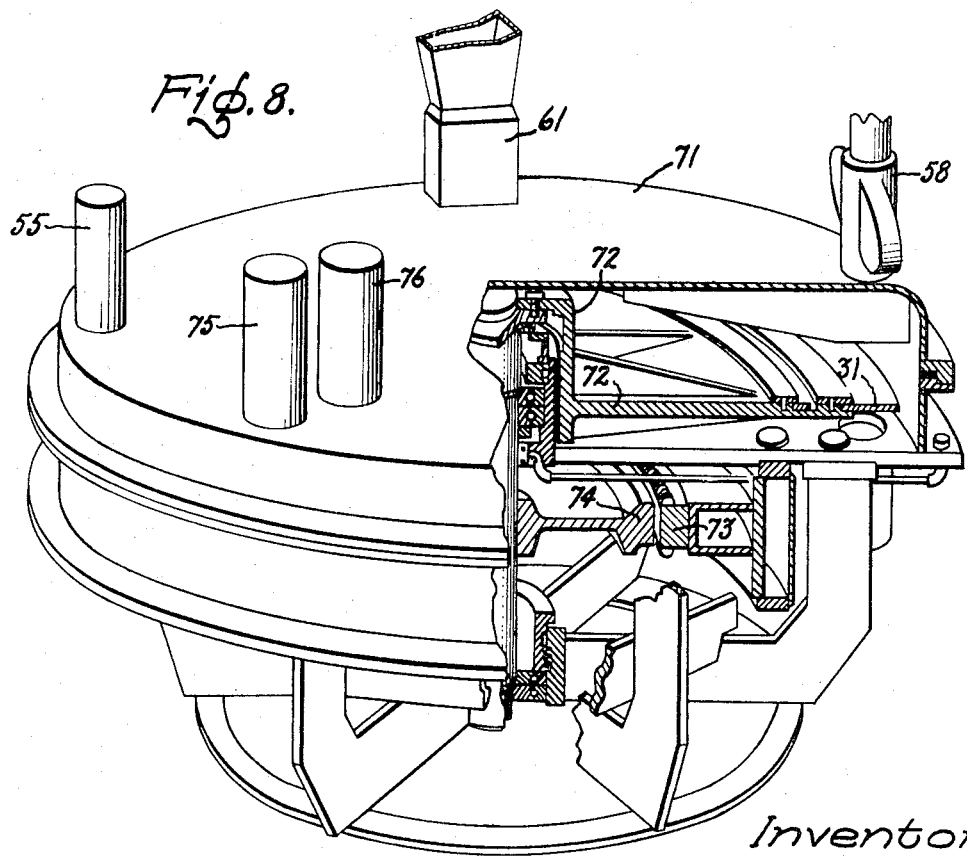
FIG. 8 is a partially broken away perspective view of a recording turntable construction comprising the heart of the beam forming system illustrated in the functional block diagram of FIG. 7.
Figure 9:
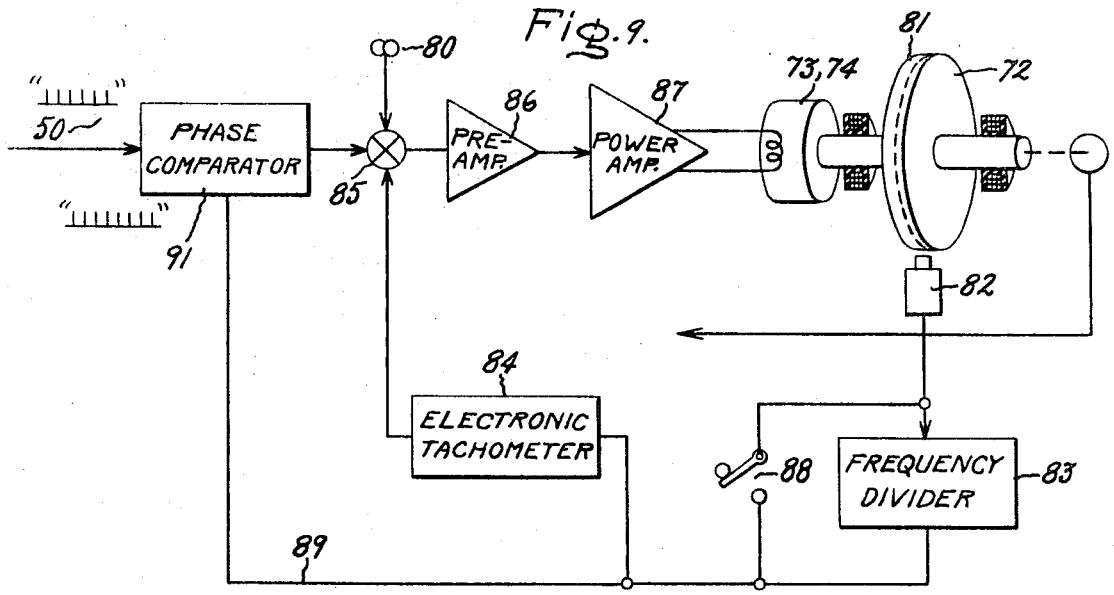
FIG. 9 is a functional block diagram of a constant speed control system used for controlling the speed of rotation of the turntable shown in FIG. 8.

A practical physical construction for the data processing system illustrated schematically in FIG. 7 is shown in FIG. 8 of the drawings. As can be readily determined from an examination of FIG. 5, the heart of the data processing system is the rotatable disk 31 of thermoplastic film on which the several tracks of signals are written for subsequent optical readout in the beam forming process. For this reason, most of the components of the data processing system are built around the housing for the rotatable thermoplastic disk 31 as shown in FIG. 8. The housing 71 encloses a rotatable turntable 72 which has an annular thermoplastic recording disk 31 secured around its outer periphery. The thermoplastic recording disk 31 actually comprises an annular member fabricated in the manner described with relation to FIGS. 5 and 6 of the drawings, and is sufficiently wide to accommodate at least the 100 record tracks representing the incoming signals as originally received, and the 200 record tracks derived by the beam forming process as outlined above. It is anticipated that these tracks will be recorded in concentric relation so that, in effect, each track is parallel with the remaining tracks in the set. The rotatable turntable 72 is suitably journalled within the housing 71 on a set of bearings; and is rotated by a multipole d.c. motor having its rotor 73 secured to the turntable, and its stator 74 secured to an axial post to which the rotatable turntable 72 is journalled. The motor 73, 74 is controlled by a speed control system, shown in FIG. 9, which will be described more fully hereinafter. The motor 73, 74 serves to rotate the thermoplastic film recording disk 31 past the input writing gun 55 at a predetermined constant speed related to the timing of the sonar signals being transmitted and received, and the input writer 55 serves to record a plurality of tracks of light modifying marks on the thermoplastic film surface of the disk, there being one track for each of the signal receiving towers in the receiving array. Upon completion of the recording process as previously described, the motor 73, 74 is speeded up. For example, during the recording process, one revolution of the recording disk 31 may require approximately 22 minutes for a recording disk having a diameter of five feet. Upon completion of the recording process, however, the speed of rotation of the turntable 72 may be increased to something like 300 rpm so as to facilitate the subsequent beam forming operation. The beam forming operation is carried on at the beam forming station 58 wherein a plurality of different beam forming masks are stored on a thermoplastic film tape and the tape rolled in the form of a reel. This reel of thermoplastic film beam forming masks is then moved past the thermoplastic film disk 31 by a suitable high speed movie camera mechanism in accordance with a predetermined schedule, as will be described more fully hereinafter.

MOTOR DRIVE CONTROL

Optical readout for beam formation and for correlation requires that the incoming signal be recorded with a precise relation between recorded position on the thermoplastic film recording disk 31 and the time of reception. This requirement is reflected in the need for an accuracy of one part in 30,000 in the motor drive unit for the turntable 72 on which the thermoplastic film recording disk 31 is mounted. These accuracies apply only during the period when the drum is running at its slow recording speed of approximately 1/20 of a revolution per minute to record the incoming signals. The requirements are less severe during the period when the drum is running at a high speed, approximately 300 rpm, for the beam forming operations. While these requirements are not too severe, they are beyond the capabilities of any open loop synchronous motor drive in view of the low rotational speed required for recording. A high performance servo system with feedback from the drum periphery is required in order to assure the kind of accuracy needed. Such systems are presently being produced by the General Electric Company, and are available commercially. One such system is the Mark 73 Director manufactured and sold by the Heavy Military Electronics Department of the General Electric Company. This system is shown schematically in FIG. 9 of the drawings. This system is built around a gearless drive motor 73, 74 which is mechanically connected to the turntable 72 without gearing. By this arrangement gear backlash is eliminated from the servo system, thereby making possible servo gains much greater than those normally obtained with a geared system. The turntable 72 on which the thermoplastic film recording disk 31 is mounted has a reference track 81 consisting of some 60,000 lines formed around its periphery. These reference marks are read out by an optical pick-up device 82 positioned adjacent the tracks and which converts the marks to a reference electric signal that is fed through an appropriate frequency dividing circuit 83 back to an electronic tachometer circuit 84. The signal from the electronic tachometer is then supplied to a comparator circuit 85 along with a speed control voltage 80 used to set the speed of the system. The two voltages are compared in the comparator 85 and an error signal is developed which is supplied through a preamplifier 86 and power amplifier 87 back to the motor 73 to maintain its speed constant at the value set by the speed control voltage 80. It should be noted that the frequency divider 83 is required only during the high speed operation of the motor so that during the slow speed recording operation, the frequency divider 83 would be normally by-passed by a by-pass switch 88. The above system comprises a more or less conventional speed control loop which is further improved by the addition of a second feedback through the conductor 89 to a phase comparator circuit 91. Also supplied to the phase comparator circuit 91 is a 50 cycle per second signal generated by a crystal controlled oscillator (not shown) which is extremely stable in operation. The phase comparator 91 serves to compare the signal supplied over the conductor 89 to the stabilized 50 cycle signal supplied from the oscillator and to develop an error signal if there is a difference between the two voltages which is coupled back to the reference voltage comparator 85. In this manner, operation of the drum 31 can be locked in with the 50 cycle signal source. When converting the system to high speed operation for the beam forming and pulse correlation process, all that is required is to insert the frequency divider circuit 83 into the system and to increase the speed control signal to bring the turntable speed within the high speed range of the system. Accordingly, it can be appreciated that the speed of the rotatable turntable can be controlled within the available tolerances.

BEAM FORMING OPERATION

The principle behind the beam forming operation can be best understood in conjunction with FIGS. 10 through 14 of the drawings. In considering these figures, it should be remembered that a cycle of sound energy reflected from a target object in water returns towards the receiver with a curved wave-front. This curved wave-front will reach the receiver array elements at different times depending upon the three-dimensional geometry of the receiving array and the wave-front. Hence, a returning target echo signal will have different phase relations at the various receiving array elements. In order to maximize sensitivity of the system to this returning target echo, it is necessary to insert delays in the array element outputs in order to effect precise compensation for the differences in arrival times. Upon the appropriate family of delays being applied to the signals from all of the receiving array elements, all echoes from a given direction and range zone will add in phase. Echoes from any other direction will not be in phase and, hence, the array is made to be directional by forming beams with appropriate arrangement of receiver signal delays inserted in the optical readout. The present system forms beams in this manner in a very simple and efficient way. First, it should be remembered that the signals from each of the receiver array elements is recorded on an individual track on the thermoplastic film recording disk 31, and the speed of rotation of the thermoplastic film recording disk past the writing gun 55 is accurately controlled so that there is a precise one-to-one relation between the signal position on the disk 31 and the time of the arrival of the signal at its associated receiving array element. With a record thus obtained, it is then possible to insert accurate delays between the signal channels for beam forming purposes by reading out at different points on each set of tracks. The distance along the track represents the relative time of signal reception; thus, in order to form a beam, all that is necessary is to read all of the recorded tracks with a pattern of points where the arrival time differences between the points and hence the receiving array elements are compensated. In the present data processing system, thermoplastic film beam forming masks form the compensated pattern of points which are used to select the points of readout along the tracks. Each of these thermoplastic film beam forming masks is calibrated to insert the desired delays between the points of readout so as to achieve a desired beam forming effect. In the proposed system, a number of thermoplastic film beam forming masks are used sequentially to select the points of readout. For this purpose, a stationary optical system is used to project the image of a section of the 100 signal track records onto a selected mask which has been appropriately designed to cause the array of receiving elements to look at one particular angular increment. This arrangement is illustrated schematically in FIG. 13 of the drawings wherein a light source is caused to image light rays 101 through the light modifying tracks 35 on the recording disk 31 onto a beam forming mask 58. The beam forming mask 58 has been designed to appropriately select the points of readout of the record tracks 35 with a plurality of light modifying marks 102 whose character will be described more fully hereinafter. The light modifying marks 102 are positioned so that any light that is imaged thereon from the light modifying tracks 35 in the thermoplastic film recording medium 31 is refracted onto a collecting lens 103 which serves to then image the light onto an appropriate electro-optical converting device formed by a photocell 104. It can be appreciated that the light rays 101 from the stationary light source will be refracted by the light modifying tracks 35 in a manner determined by the phase relation of the light modifying tracks at this particular point of readout and the light modifying marks 102 in the thermoplastic film mask 58. Assuming that this phase relation is the proper one, then the light rays will be refracted through the collecting lens 103 and imaged upon the photocell 104 to generate an electric output signal representative of phase coincidence between the record tracks on the thermoplastic film recording medium 31 and the mask 58 at a particular point along the tracks. In order to scan the entire period of signal reception, the record tracks will be rotated through one complete revolution of the turntable 72 past the readout optics. Hence, the succession of returned signal tracks moving across the light modifying marks on the mask produces an alternating output voltage. Summation of the alternating components by a single phototube then provides an electric output signal which represents the result of scanning one angular increment in the field of view of the array of receiving elements.

Figure 10:
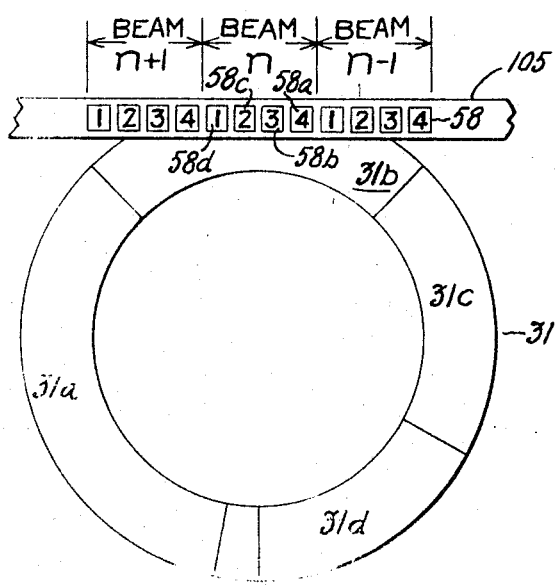
FIG. 10 is a schematic arrangement of the annular thermoplastic recording disk 31 and beam forming masks showing the relation of these two elements of the beam forming system.
Figure 11:
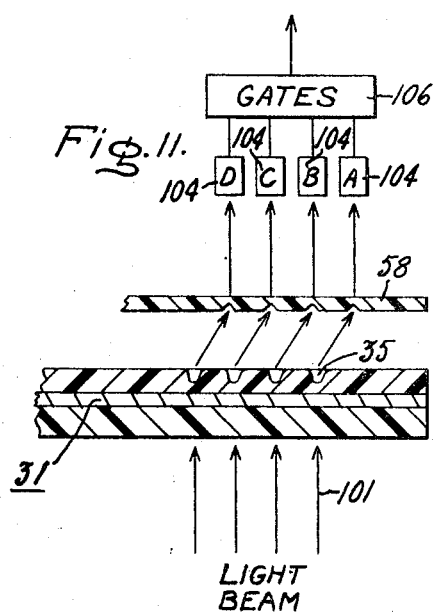
FIG. 11 is a sectional view of a portion of the turntable and beam forming mask and shows the relation of these two elements to a plurality of photocell signal generating devices used in the beam forming system.

In order to provide the thousands of masks in sequence required to read out each angular increment in the sector under surveillance, the appropriate beam forming patterns are recorded in succession on a strip 105 of thermoplastic film in the manner illustrated in FIG. 10 of the drawings. In FIG. 10 the thermoplastic film recording disk 31 is shown adjacent the strip 105 of thermoplastic film which has a succession of masks 58 formed thereon. The masks 58 are arranged in frames of four masks, each frame being indicated by "Beam N," "Beam N+1," and "Beam N−1." The system is designed to index one frame of four masks each at the end of each revolution of the disk 31 and it is proposed to change these frames by means of a high speed motion picture mechanism (not shown) on which the thermoplastic film 105 is mounted. The reason for arranging four thermoplastic film masks 58 together in a frame is connected with the problems of readout from the several range zones. As shown in FIG. 10, the thermoplastic film recording disk 31 is divided into four range zones starting with 31a, 31b, 31c, and 31d. Each of the range zones represents a particular range zone in the sector under surveillance. As discussed previously, these different range zones are required because a different mask pattern will be required for each of the range zones in a particular angular element being looked at. In other words, as stated earlier, the angular increments themselves are range dependent so that in order to generate the proper phase relations in a mask, the mask itself must be designed for a particular range zone within the angular azimuth element under consideration. Accordingly, in the readout process, assuming that in the arrangement shown in FIG. 10 the mask marked "Beam N" is in use and that the thermoplastic film recording disk 31 is rotated counterclockwise, then in reading out the signal tracks in the range zones 31a, the mask 58a will be used, in reading out the range zones 31b, the mask 58b will be employed; and so on through one complete revolution of the thermoplastic recording disk 31. In order to distinguish the signals from each of the several range zones, a number of photocell readout devices are required, such as is illustrated in FIG. 11 of the drawings. In this arrangement, light rays indicated at 101 from the stationary light source will pass through the record tracks formed by the light modifying marks 35 in the thermoplastic recording medium 31, and will be refracted by the light modifying marks in these tracks and directed to all masks 58a – 58d in the readout position noted by the frame marked "Beam N." Light thus refracted will then be directed simultaneously upon the plurality of readout photocell devices 104a, 104b, 104c, and 104d. The electrical output signals generated by these devices are then supplied through a gating circuit 106 to an output data recorder or other display device. The gating circuit 106 is of conventional construction, and merely serves to gate on each of the photocells 104a, 104b, etc. in sequence in synchronism with the rotation of the thermoplastic recording disk 31. In this fashion, only the photocell 104a will be effective to supply an output signal while the range zone 31a is passing under the thermoplastic film mask tape 58, only the photocell 104b will be effective while the range zone 31b passes under the thermoplastic film mask 58, etc., and so on through a complete revolution of the thermoplastic recording disk 31. Upon completion of the readout of the frame marked Beam N at the end of the revolution of the disk 31, the high speed motion picture mechanism will step the tape one frame so as to position the next frame marked Beam N+1 in the readout position occupied by Beam N as shown in FIG. 10.

The precise fabrication of the thermoplastic film beam forming masks is best shown in FIG. 12 and FIG.

12a of the drawings. Each of the beam forming masks 58a, 58b, 58c, and 58d of a single frame is formed by a series of light modifying mark 35 formed transverse to the axial direction of the tape in a predetermined pattern of points which have been selected to provide appropriate delays between the various points of readout on the record tracks of the thermoplastic film recording disk 31. There will be some 100 of these light modifying marks 35 extending in a direction transverse to the length of the tape so that a selected point on every track relative to the remaining tracks will be read out simultaneously as the record tracks on disk 31 are rotated under the mask. The character of the light modifying marks 35 is shown more clearly in FIG. 12a which is a greatly magnified view of the portion or segment of the mask 58b. From an examination of FIG. 12a, it can be appreciated that the light modifying marks 35 constitute apertures or slits which are generally rectangular in shape, and are approximately one hundredth of an inch in length and 25 ten-thousandths of an inch in breath. Some 100 of these marks placed essentially side-by-side will extend across only approximately an inch of the tape so that all 300 tracks to be formed on the thermoplastic film recording disk 31 in any one data processing operation can be accommodated on the approximately three to five inch wide annular disk 31. The marks 102 will be written on the thermoplastic film masks with an electron writer similar to the writer shown in FIG. 5 but modified to allow for deflection of the electron beam appropriate amounts in accordance with the desired delay patterns.

The details of construction of the optical system used to image the light passing through the track recordings upon the beam forming masks is illustrated in FIG. 14 of the drawings. In FIG. 14, a light source is positioned at 110 and 111, as shown, and light from this source passes through a field lens 112 which tends to collect the light and to image it on the thermoplastic film track record 31 as shown. Only that light which hits a light modifying mark 35 in the track record 31 will be refracted to impinge upon a projection lens 113 that is positioned intermediate a pair of stops 114. The projection lens 113 projects an image of the refracted light onto the thermoplastic film mask 58. Light striking the light modifying marks 102 in the thermoplastic film mask 58 is again refracted, and passed through a collecting lens 118 which impinges the light thus refracted upon a pair of photodetectors 119 and 120. It is to be understood that there will be four sets of such projection lenses, together with their associated pairs of photodetectors 119, 120 and 118, with each set being positioned immediately in back of its respective thermoplastic film mask 58a, 58b, 58c, or 58d, as the case may be. For the purpose of convenience, however, only one such mask has been shown, it being understood that three additional masks could be arranged side-by-side into the plane of the paper. It can be appreciated from an examination of FIG. 14 that only the light rays which are deviated by the light modifying tracks 35 in the recording disk 31 will enter the projection lens 113, and then be imaged on the projection lens 113. Again, only those light rays which strike one of the light modifying marks 102 on the masks 58 will be refracted and imaged by the second projection lens 118 upon the photodetectors 119 or 120 to thereby produce an output electric signal representative of the fact that coincidence exists between the light modifying tracks 35 on the recording disk 31 and the light modifying marks 102 on the thermoplastic film mask 58 at this particular point along the length of the record tracks on disk 31.

From the foregoing description, it can be appreciated that the invention provides a new and improved beam forming system for forming the signals received from an array of signal pick-up devices into a plurality of output signals representative of the signal returns from selected elemental angular segments of the field of view of the array of signal pick-up devices.

Accordingly, having described one embodiment of a beam forming system constructed in accordance with the invention, it is believed obvious other modifications and variations of the invention are possible in the light of the above teachings. It is, therefore, to be understood that changes may be made in the particular embodiment of the invention described which are within the full intended scope of the invention as defined by the appended claims.

What I claim as new and desire to secure by Letters Patent of the United States is:

1. Apparatus for beam forming signals received from an array of signal pick-up devices including in combination recording means for receiving and recording on a recording medium the signal inputs from an array of signal input devices, said recording medium being adapted to have its light modifying characteristics changed by said recording means in accordance with the signal inputs to said recording means whereby a plurality of tracks of light modifying marks are recorded on the recording medium with each track of marks representing the signal supplied from one signal input device of the array, a light source positioned adjacent the recording medium for imaging a light beam through the tracks on the medium, beam forming mask means positioned over said recording medium for disposing over the recorded tracks in a selected sequence masks representing optimum signal output from each elemental point of a selected range of view of the array of signal pick-up devices, and electro-optical conversion means for converting the light passing through both the record track and the mask into an electric output signal representative of coincidence between the mask and the track record at points where such coincidence occurs.

2. Apparatus for beam forming signals received from an array of signal pick-up devices including in combination:
 1. recording means for receiving and recording in real time on a recording medium the signal inputs from an array of signal input devices, said recording medium being adapted to have its light modifying characteristics changed by said recording means in accordance with the signal inputs to said recording means whereby a plurality of tracks of light modifying marks are recorded on the recording medium with each track of marks representing the signal supplied from one signal input device of the array over a predetermined period of time with all of the tracks being divided into a plurality of different range zones representative of the different distance range zones covered by the view of the array,
 2. means for moving said recording medium past said first recording means at a rate related to the timing of the signals being received by the array of signal input devices, said moving means having means for increasing the rate of movement of said recording medium to a second predetermined rate during the subsequent beam forming process, 3. a light source positioned adjacent the recording medium for imaging a light beam through the tracks on the medium, 4. beam forming mask means positioned over said recording medium for disposing over the recorded tracks in a selected sequence masks arranged in predetermined frames with each mask representing optimum signal output from a predetermined range zone of each elemental azimuth beam of a selected azimuth fan viewed by the array of signal pick-up devices, and 5. electro-optical conversion means for converting the light passing through both the record track and the mask into an electric output signal representative of coincidence between the mask and the track record at points where such coincidence occurs.

3. Apparatus for beam forming recorded data including in combination:
   1. recording means for receiving and recording on a thermoplastic film recording medium the signal inputs from an array of signal input devices, said thermoplastic film recording medium being adapted to have its light modifying characteristics changed by said recording means by electron writing in accordance with the signal inputs to said recording means whereby a plurality of tracks of light modifying marks are recorded on the thermoplastic film recording medium with each track of marks representing the signal supplied from one signal input device of the array,
   2. a light source positioned adjacent the thermoplastic film recording medium for imaging a light beam through the tracks on the medium,
   3. thermoplastic film beam forming mask means positioned over said recording medium for disposing over the recorded tracks in a selected sequence thermoplastic film masks representing optimum signal output from each elemental beam of a selected azimuth fan viewed by the array of signal pick-up devices, and
   4. electro-optical conversion means for converting the light passing through both the record track and the mask into an electric output signal representative of coincidence between the mask and the track record at points where such coincidence occurs. 9

4. Apparatus for beam forming signals received from an array of signal pick-up devices including in combination:
   1. first recording means for receiving and recording in real time on a thermoplastic film recording medium the signal inputs from an array of signal input devices, said thermoplastic film recording medium being adapted to have its light modifying characteristics changed by said recording means by electron writing in accordance with the signal inputs to said recording means whereby a plurality of tracks of light modifying marks are recorded on the thermoplastic film recording medium with each track of marks representing the signal supplied from one signal input device of the array over a predetermined period of time, with all the tracks being divided into four different range zones representative of four different distance range zones covered by the view of the array,
   2. means for moving said recording medium past said first recording means at a rate related to the timing of the signals being received by the array of signal input devices, said moving means having means for increasing the rate of movement of said recording medium to a second predetermined rate during the subsequent beam forming and correlation process,
   3. a light source positioned adjacent the thermoplastic film recording medium for imaging a light beam through the tracks on the medium,
   4. thermoplastic film beam forming mask means positioned over said recording medium for disposing over the recorded tracks in a selected sequence thermoplastic film masks representing optimum signal output from each elemental beam of a selected azimuth fan viewed by the array of signal pick-up devices, and
   5. electro-optical conversion means for converting the light passing through both the record track and the mask into an electric output signal representative of coincidence between the mask and the track record at points where such coincidence occurs.

5. Apparatus for beam forming signal received from an array of signal pick-up devices including in combination:
   1. first recording means operatively coupled to an array of signal input devices for individually recording the signal inputs from each signal input device in the array,
   2. a rotatable turntable having a surface formed of a thermoplastic film recording medium of the type adapted to have its light modifying characteristics changed by recording thereon with electrons written in intelligence conveying patterns,
   3. said rotatable turntable being positioned in recording relation with respect to said first recording means whereby a plurality of parallel tracks of light modifying marks are formed in the thermoplastic film recording medium peripherally around the turntable with each track of marks representing the signal supplied from one signal input device of the array,
   4. a first light source positioned adjacent the turntable for imaging a light beam through the tracks on the turntable,
   5. beam forming mask means positioned over the tracks in the turntable for disposing over the tracks in a selected sequence masks reprsenting optimum signal output from each elemental point of a selected range of view of the array of signal pick-up devices, and
   6. electro-optical conversion means for converting the light passing through both the record tracks and the beam forming masks into an electric output signal representative of coincidence between the masks and the track record at points where such coincidence occurs.

6. Apparatus for beam forming signals received from an array of signal pick-up devices including in combination:
   1. recording means operatively coupled to an array of signal pick-up devices for individually recording in real time the signal inputs from each signal input device in the array over a predetermined period of time with all the tracks being divided into a plurality of different range zones representative of an equal number of different distance range zones covered by the view of the array, 2. a rotatable turntable having a surface formed of a thermoplastic film recording medium of the type adapted to have its light modifying characteristics changed by recording thereon by electron writing in intelligence conveying patterns, 3. said rotatable turntable being positioned in recording relation with respect to said first recording means whereby a plurality of parallel tracks of light modifying marks are formed in the recording medium periphery around the turntable with each track of marks representing the signal supplied from one signal input device of the array, 4. means for rotating said turntable at a first rate related to the timing of the signals being received by the array of signal input devices, said rotating means having means for increasing the rate of rotation of said turntable to a second predetermined rate during the subsequent beam forming process, 5. a first light source positioned adjacent the recording medium for imaging a light beam through the tracks on the turntable, 6. thermoplastic film beam forming mask means positioned over said tracks in the turntable for disposing the tracks in a selected sequence thermoplastic film masks arranged in predetermined groups with each mask representing optimum signal output from a predetermined range zone of each elemental azimuth beam of a selected azimuth fan viewed by the array of signal pick-up devices, and 7. electro-optical conversion means for converting the light passing through both the record tracks and the beam forming masks into an electric output signal representative of coincidence between the masks and the track record at points where such coincidence occurs.

7. The method of using a plurality of predesigned masks for beam forming a record of signals received by an array of signal pick-up devices and recorded on a plurality of tracks on a moving recording medium wherein each point on a track represents a signal picked up by a respective pick-up device in the array, measured with respect to time, said method comprising projecting a beam of light through the record, disposing over the recorded tracks in a selected sequence masks representing optimum signal output from each elemental point of a selected range of view of the array of signal pick-up devices, and converting the light images passing through both the record track and the masks into an electric output signal representative of coincidence between the mask and the track record at points where such coincidence occurs.

8. The method of using a plurality of predesigned masks for beam forming a record of signals received by an array of signal pick-up devices comprising recording the signals picked up by the array in real time on a plurality of tracks on a linearly moving recording medium wherein each track represents the signal picked up by a respective pick-up device in the array, measured with respect to a linear time scale, the recording taking place over a predetermined period of time with all the tracks being divided into a plurality of range zones representative of an equal number of different range zones covered by the view of the array, upon completion of the recording step speeding up the movement of the recording medium past a readout station, projecting a beam of light through the record, disposing over the recorded tracks in a selected sequence masks arranged in predetermined frames with each mask representing optimum signal output from a predetermined range zone of each elemental angular segment viewed by the array of signal pick-up devices, and converting the light images passing through both the record track and the masks into an electric output signal representative of coincidence between the mask and the track record at points where such coincidence occurs.

* * * * *